Aug. 21, 1934.  A. Y. DODGE  1,970,845
LUBRICATING DEVICE
Filed April 1, 1932  2 Sheets-Sheet 1
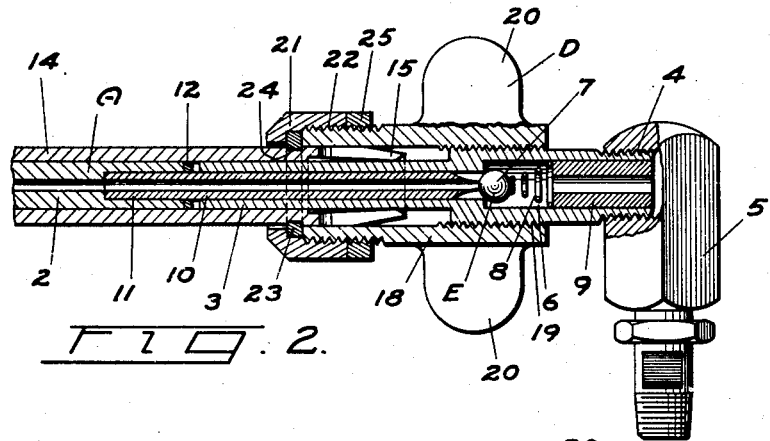
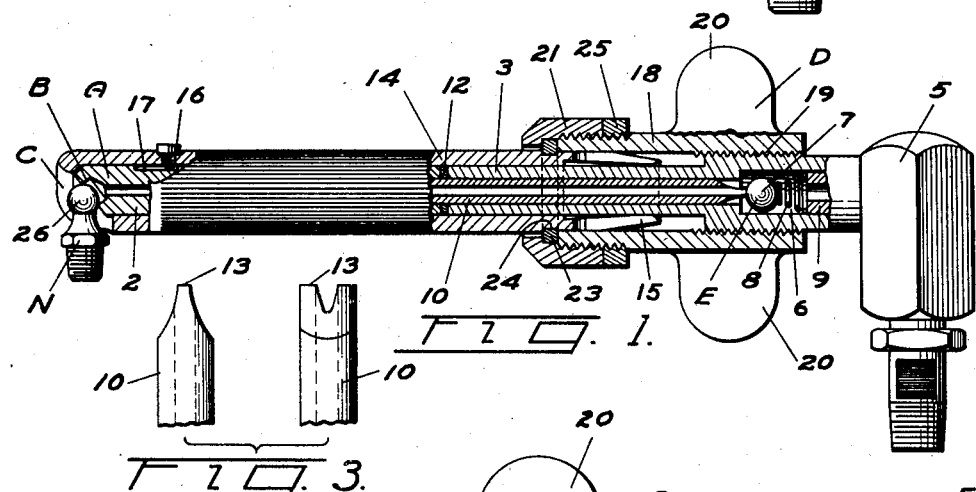
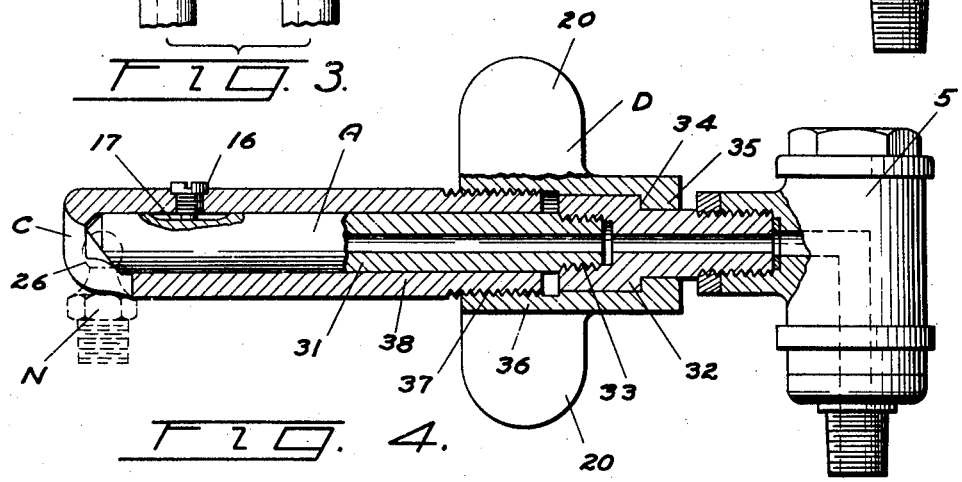
INVENTOR.
ADIEL Y. DODGE
BY
ATTORNEY.

Aug. 21, 1934.                    A. Y. DODGE                    1,970,845
                               LUBRICATING DEVICE
                           Filed April 1, 1932         2 Sheets-Sheet 2
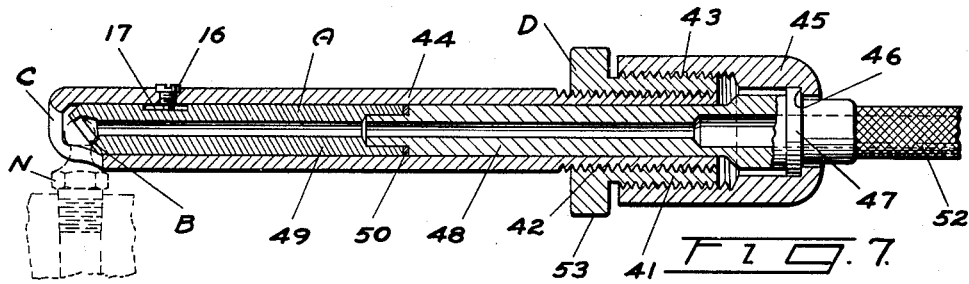
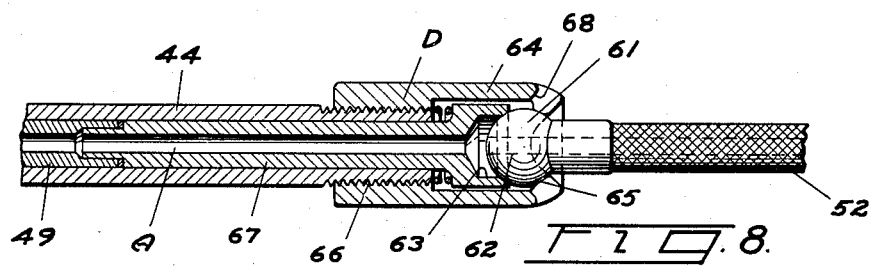
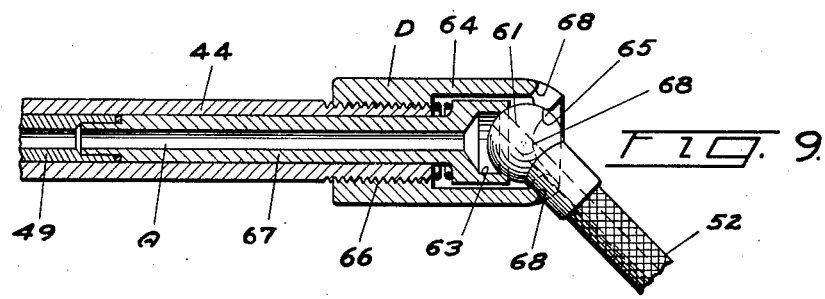
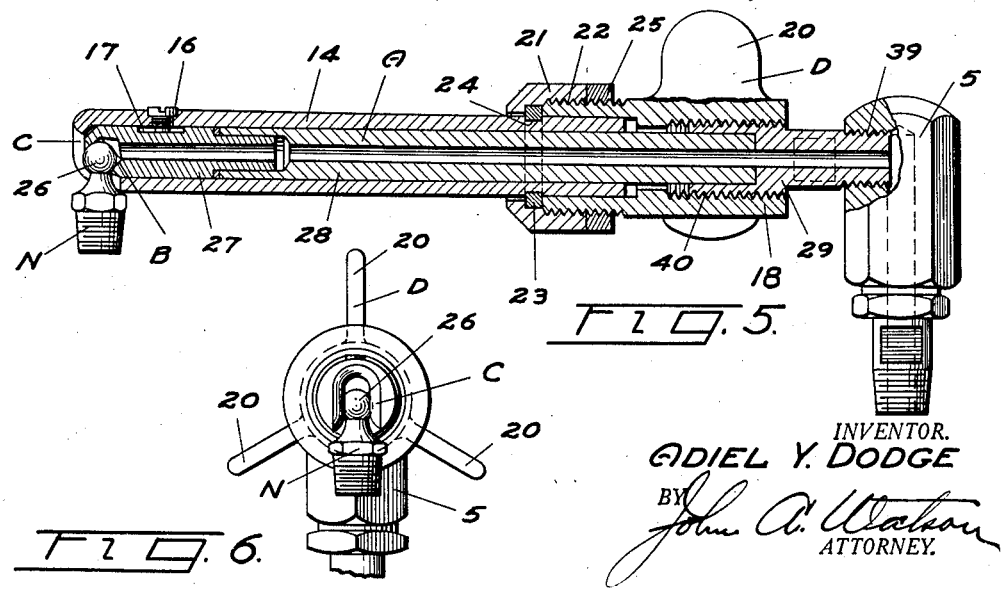
INVENTOR.
ADIEL Y. DODGE
BY
ATTORNEY.

Patented Aug. 21, 1934

1,970,845

UNITED STATES PATENT OFFICE 1,970,845

LUBRICATING DEVICE

Adiel Y. Dodge, South Bend, Ind., assignor to The Lubrication Corporation, South Bend, Ind., a corporation of Delaware Application April 1, 1932, Serial No. 602,419

12 Claims. (Cl. 284—17)

This invention relates to lubrication devices and more particularly to lubricant discharge nozzles of the type incorporating means for clamping the discharge orifice of the nozzle to a lubricant nipple or fitting associated with a bearing or part to be lubricated.

An object of the invention is to provide an improved and simplified lubricant discharge nozzle of the manually operated clamp type.

Another object is to provide a clamp type lubricant discharge nozzle wherein the clamping and unclamping of the nozzle to and from the head of a lubricant nipple or fitting may be carried out by the rotation of a manually engageable member about the longitudinal axis of the nozzle.

A further object is to provide a lubricant discharge nozzle in which the clamping member and that portion of the lubricant conduit including the discharge orifice of the nozzle may be rotated with respect to the remaining parts of the nozzle and the lubricant conducting hose which may be connected therewith.

A still further object is to provide a lubricant discharge nozzle wherein extremely high clamping force may be applied to clamp the discharge orifice upon a lubricant fitting by relatively little manual effort.

Another object is to provide a clamp type lubricant discharge nozzle having a relatively small number of parts, which may be easily operated and which is adaptable for use under high lubricant pressures.

Other objects, the advantages and uses of the invention will be, or should become apparent after reading the following description and claims and after consideration of the drawings forming a part of this specification, in which:

Fig. 1 is a view partially in section, of a clamp type lubricant discharge nozzle constructed in accordance with my invention, shown clamped to a lubricant fitting;

Fig. 2 is a view of a part of the mechanism illustrated in Fig. 1 shown in that position assumed when unclamped from the fitting;

Fig. 3 is an enlarged fragmentary plan view of a part of the valve mechanism of the nozzle illustrated in Figs. 1 and 2;

Fig. 4 is a view, partially in section, of another form of the discharge nozzle;

Fig. 5 is a view, partially in section, of a further modification of the discharge nozzle;

Fig. 6 is an end elevation of the discharge nozzle illustrated in Fig. 5;

Fig. 7 is a sectional view of another modification of the discharge nozzle;

Fig. 8 is a fragmentary sectional view of a still further modification of the discharge nozzle incorporating a swivel connection between conduit and supply hose; and Fig. 9 is a view similar to Fig. 8 illustrating the swivel joint at the lateral limit of its range of movement.

In general the lubricant discharge nozzles selected to illustrate my invention herein comprise a lubricant conduit A formed with a discharge orifice B at the forward end for partially receiving the head of a lubricant nipple or fitting N, a tubular member movable relative to the conduit A formed with an integral nipple engaging clamp member C for clamping the discharge orifice B of the conduit upon the head of the fitting N and manually operable force multiplying screw mechanism D for causing relative movement between the conduit and the tubular member to carry out the clamping function of the member C.

With reference to Figs. 1 to 3 of the drawings the discharge nozzle illustrated therein includes in addition to the elements A, B, C and D, an automatic valve E for preventing the flow of lubricant through the nozzle when the nozzle is unclamped and disengaged from the fitting. This feature obviates the necessity of employing a separate control valve of the character well known in the art and usually placed in the hose line leading to the nozzle conduit.

The conduit A consists of two members 2 and 3, the member 2 comprising its forward end and including the discharge orifice B, and the member 3 comprising the rearward portion of the conduit and having an externally threaded portion 4 for receiving a lubricant hose connector swivel 5 to which a hose (not shown) comprising a part of the source of lubricant supply may be connected. The bore of the member 3 is relatively large at its rearward end, as shown at 6, and a ball valve 7 is disposed therein having a spring 8 one end of which bears against the ball and the other end against a tubular member 9 disposed within the rearward end of the bore and secured thereto by press fit. A valve operating tube 10 is disposed within the bore of the forward portion of the conduit member 3 and for a short distance within an enlargement 11 formed in the bore of the member 2. The major portion of the bore of the member 2 and of the valve operating tube 10 are of the same diameters. A packing ring 12 is disposed about the tube 10 between the adjacent ends of the conduit members 2 and 3.

The rearward end of the tube 10 is tapered to a relatively sharp edge, as shown at 13 in Fig. 3, so as to engage with the ball valve 7 upon relative movement of the members 2 and 3 toward one another to unseat the valve and permit lubricant to flow through the conduit. The spring 8 of the valve acting through the medium of the valve ball 7 and the tube 10 tends to urge the member 2 of the conduit forwardly until the valve is seated as shown in Fig. 2.

The tubular member 14 of which the clamping member C may be an integral part, as shown, is disposed about the conduit A and frictionally engaged therewith at its rearward end by an integral collet 15. A stud screw 16 extending through the side wall of the member 14 and into a groove 17 in the side wall of the member 2 of the conduit serves to prevent rotational movement between the clamping member C and the discharge orifice B of the nozzle. The outer wall of the member 14 is knurled to facilitate manual rotation of the members 14 and 2 about the conduit member 3.

The force multiplying screw mechanism D comprises a sleeve 18 having internal left handed threads 19 at its rearward end engaged with an externally threaded portion of the conduit member 3. Three, equally spaced apart, laterally extending wings 20 are formed upon the sleeve so that it may be readily rotated upon the threaded conduit. The sleeve 18 is connected at its forward end with the member 14 through an adjustable swivel connection formed of a bushing 21 disposed upon an externally threaded portion 22 of the sleeve and engaged with a split ring 23 disposed in an annular slot 24 on the adjacent side wall of the member 14. A lock washer 25 is provided for locking the bushing in place upon the sleeve.

Prior to clamping the nozzle, illustrated in Figs. 1 to 3, upon the lubricant fitting N the separable conduit members 2 and 3 and the valve E appear as shown in Fig. 2. The nozzle may therefore be moved laterally over the enlarged head 26 of the fitting N at which time the member 2 of the conduit and the tube 10 will be pressed rearwardly against the resistance of the spring 8 of the valve E as the head is pressed between the clamping member C and the discharge orifice B of the nozzle. The clamping member C is of the general type illustrated and described in the United States patent to Herlihy Re. 18,288 and permits the rotation of the nozzle about the center of the head 26 in a counterclockwise direction from that position shown in Fig. 1 through an arc of substantially 90°.

After initial engagement of the discharge orifice B of the nozzle with the fitting, as described, the operator may rotate the sleeve 18 by gripping and turning upon the wings 20 thus causing relative movement of the conduit A and tubular member 14 to cause the clamping member C to bear upon the remote side of the fitting head and to draw the discharge orifice B against the adjacent portion of the head to securely clamp the fitting thereto. At this time the valve E will be open due to the longitudinal thrust upon the conduit A to cause the members 2 and 3 thereof to be compressed against the washer 12 as shown in Fig. 1.

The nozzle may be disengaged from the fitting by rotating the sleeve 18 in the opposite direction thus causing the parts to reassume the position in Fig. 2.

In order that the nozzle may most conveniently approach the fitting the operator may, at will, rotate the member 14 with its clamping member C together with the member 2 of the conduit to any position desired with respect to the remaining parts of the nozzle and the friction collet 15 will maintain such adjustment as made.

In Fig. 4 I have shown another form of the nozzle of relatively simple construction wherein the conduit A comprises a member 31 including the discharge orifice B and a member 32 secured by threaded connection 33 thereto. The outer end of the member 32 is externally threaded and engaged with the internally threaded recess of the swivel connector 5.

The member 32 of the conduit A has a shoulder 34, formed intermediate its length, against which an inwardly extending flange 35 formed on the rear and inner wall of a sleeve 36 bears. The sleeve 36 is a part of the clamp operating mechanism D and has three wings 20 extending radially therefrom to facilitate manual rotation of the sleeve. The sleeve 36 is further formed with an internally threaded portion 37 which is engaged with right hand threads formed on the rearward and outer side walls of a tubular member 38 corresponding to the member 14 and of which the clamping member C is an integral part.

This form of the discharge nozzle may be clamped to and removed from the head 26 of the nipple N by rotation of the sleeve 36 as in the case of the nozzle heretofore described. There is no provision for rotating the member 38 and cooperating conduit member however, nor is there an automatic control valve. It is suggested that this nozzle as well as those in the succeeding figures of the drawings be employed with a control valve placed in the lubricant hose line.

The discharge nozzle illustrated in Figs. 5 and 6 is similar in many respects to that illustrated in Figs. 1 to 3 and like reference numerals have been employed to designate like parts. It differs however, in that the collet 15 on the tubular member 14 is omitted as well as the valve E and its associated elements. The conduit A is constructed of three parts 27, 28 and 29. The member 27 includes the discharge orifice B and is connected to the member 28 by swivel connection. The member 29 is secured to the coupler 5 by screw threads 39 and is formed with an externally threaded portion 40 with which the internal left hand threads of the sleeve 18 are engaged.

In this form of the nozzle the clamping and unclamping of the nozzle to and from the head 26 of the fitting N is carried out by rotation of the sleeve 18 upon manual engagement with the wings 20 as in the case of the nozzle shown in the preceding figures. As in the case of the nozzle of Figs. 1 to 3 the tubular member 14 with the clamping member C and the part 27 of the conduit A including the discharge orifice B may be rotated as a unit with respect to the remaining parts of the nozzle to accommodate the nozzle to the position of the fitting N and render the approach and operation of the nozzle more convenient.

In Fig. 7 I have shown a quick acting screw mechanism D for operating the clamping mechanism wherein a sleeve 41 is employed having right handed internal threads 42 and external left handed threads 43. The threads 42 are engaged with external threads formed at the rearward end of a tubular member 44 corresponding to the members 38 and 14 within which the conduit A is disposed. The threads 43 of the sleeve are engaged with threads formed on the inner and adjacent walls of a member 45 having an inwardly extending flange 46 at its rearmost end. The flange 46 bears upon an outwardly extending flange 47 formed on the outer wall of the adjacent member 48 of the conduit A. The remainder of the conduit comprises a member 49 within which the discharge orifice B is formed. A packing washer 50 is disposed between adjacent edges of the members 48 and 49 so as to form a seal between the members when thrust is applied thereto.

In this form of nozzle the lubricant hose 52 is shown as permanently secured to the conduit A although if desired a coupling such as shown at 5 may be used.

The nozzle may be quickly and easily clamped and unclamped to and from the head 26 of the fitting N because of the left and right handed threads on the sleeve 41 which when rotated causes movement of both the parts 44 and 45 toward or away from one another depending upon the direction in which it is rotated. An integral knurled flange 53 is formed on the sleeve 41 so that the operator may grasp the nozzle by the member 45 and hose 52 and rotate the sleeve with the first finger and thumb of the supporting hand.

In Figs. 8 and 9 there is shown another form of the nozzle wherein the hose 52 is secured to a ball headed coupling member 61 having a port 62 which registers through a wide angular range of movement about the center of the ball head with an enlarged portion 63 of the bore of the conduit A. A sleeve 64 similar to the sleeve 36 is disposed over the conduit A and the ball headed coupler 61 and formed with an inwardly extending flange 65 which is arranged to bear upon the remote side of the ball head of the member 61. The forward end of the sleeve 64 is internally threaded, as shown at 66, and engaged with and supported upon the rearward and externally threaded portion of the tubular member 44. The conduit A comprises a forward member 49 and a rearward member 67 within which the enlarged portion 63 of its bore is disposed.

In order that the hose 52 and coupler member 61 may move through a relatively wide range the flange 65 of the sleeve 64 is recessed, as shown at 68, at four equally spaced apart points about its circumference.

This form of nozzle is clamped and unclamped to and from the head of the fitting by rotation of the sleeve 64 upon the threaded rearward end of the tubular member 44. When the nozzle is in its clamped position the coupler 61 is drawn tightly against the mouth of the enlarged portion 63 of the conduit bore to form a lubricant tight seal therewith and to lock the hose and coupler in their adjusted position. The forward ends of the tubular member 44 with its integral clamping member C and the conduit A with its discharge orifice B are not shown in Figs. 8 and 9 as the construction is identical to that shown in Fig. 7.

It is to be understood that the embodiments of the invention herein set forth are presented for the purpose of illustration only, and various changes may be made without departing from the spirit of the invention and the scope of the claims.

I claim:

1. A lubricant discharge nozzle comprising, a lubricant conduit having a discharge orifice adapted to engage with a lubricant nipple, a clamping member movable longitudinally with respect to said conduit for clamping said nozzle on said nipple, and means including a threaded sleeve for causing relative movement between said conduit and said clamping member when the sleeve is rotated, said conduit being formed of two parts free to rotate with respect to one another on a common axis, that part including said discharge orifice being coupled to said clamping member by a lost motion connection to permit limited relative longitudinal movement and to prevent relative rotational movement.

2. A lubricant discharge nozzle comprising, a lubricant conduit having a discharge orifice adapted to engage with a lubricant nipple, a clamping member movable longitudinally with respect to said conduit for clamping said nozzle on said nipple, means including a threaded sleeve for causing relative movement between said conduit and said clamping member when the sleeve is rotated, said conduit being formed of two parts free to rotate with respect to one another on a common axis, that part including said discharge orifice being coupled to said clamping member by a lost motion connection to permit limited relative longitudinal movement and to prevent relative rotational movement, and packing means disposed between the two parts of said conduit to form a lubricant tight connection therebetween when thrust is applied to the conduit.

3. A lubricant discharge nozzle comprising, a conduit having a discharge orifice at one end and formed with an externally threaded portion at its opposite end, a tubular member slidably mounted on said conduit and formed with a nipple engaging clamp member at its forward end in registration with said discharge orifice, a manually operable sleeve having a threaded portion engaged with the threads on said conduit and having another portion coupled to said tubular member by a swivel connection whereby rotation of said sleeve may cause relative movement between said discharge orifice and said conduit, said conduit being formed of two parts adapted to rotate with respect to one another, and means including a lost motion connection for permitting relative longitudinal movement between the clamping member and that portion of the conduit including the discharge orifice and for preventing relative rotational movement.

4. A lubricant discharge nozzle comprising, a lubricant conduit having a discharge orifice adapted to engage with a lubricant nipple, a clamping member movable longitudinally with respect to said conduit for clamping said nozzle on said nipple, means including a threaded sleeve for causing relative movement between said conduit and said clamping member when the sleeve is rotated, and a valve associated with said conduit and clamping member operating means arranged to open upon relative movement of the conduit and clamping member in one direction and to close upon relative movement in the opposite direction.

5. A lubricant discharge nozzle comprising, a lubricant conduit having a discharge orifice the walls of which are adapted to engage with a lubricant nipple, a swivel connection in said conduit rearwardly of said discharge orifice, a clamping member movable longitudinally with respect to said conduit for clamping the nozzle upon said nipple, means including a threaded sleeve for causing relative movement between said conduit and said clamping member when the sleeve is rotated, and means for causing the outer section of said conduit including said discharge orifice to move about its axis relative to the rearward portion of the conduit with said clamping member, said rotative movement of said clamping member and said conduit section being independent of the movement of said threaded sleeve.

6. A lubricant discharge nozzle comprising, a lubricant conduit having a discharge orifice the walls of which are adapted to engage with a lubricant nipple, said conduit comprising two sections having a swivel connection therebetween, a clamping member movable longitudinally with respect to said conduit for clamping the said conduit upon said nipple, means including a threaded sleeve for causing relative movement between said conduit and said clamping member when the sleeve is rotated, and a friction member associated with said clamping member for engaging with the rearward section of said conduit.

7. A lubricant discharge nozzle comprising, a lubricant conduit having a discharge orifice the walls of which are adapted to engage with a lubricant nipple, said conduit comprising two sections having a swivel connection therebetween, a clamping member movable longitudinally with respect to said conduit for clamping said conduit upon said nipple, means including a threaded sleeve for causing relative movement between said conduit and said clamping member when the sleeve is rotated, a friction member associated with said clamping member for engaging with the rearward section of said conduit, and means for causing the forward section of said conduit including said discharge orifice to rotate with said clamping member.

8. A lubricant discharge nozzle of the clamp type comprising, a tubular member having a clamping member at its outer end, a conduit slidably disposed in said tubular member having a discharge orifice at one end in registration with said clamping member and formed at its opposite end with an enlargement in the bore thereof, a coupler having a ball head seated upon the mouth of said bore enlargement through which lubricant may be conducted to said conduit, and a manually operable sleeve engaged with the remote side of the ball head of said coupler and having threaded engagement with said clamping member whereby rotation of said sleeve may cause relative movement between said clamping member and said conduit through said ball headed coupling member.

9. A lubricant discharge nozzle of the clamp type comprising, a tubular member having a clamping member at its outer end, a conduit slidably disposed in said tubular member having a discharge orifice at one end in registration with said clamping member and formed at its opposite end with an enlargement in the bore thereof, a coupler having a ball head seated upon the mouth of said bore enlargement through which lubricant may be conducted to said conduit, and a manually operable sleeve engaged with the remote side of the ball head of said coupler and by threaded engagement with said clamping member whereby rotation of said sleeve may cause relative movement between said clamping member and said conduit through said ball headed coupling member, said sleeve having that end in engagement with said coupler formed with spaced apart recesses for increasing the range of angular movement between the coupler and the conduit.

10. A lubricant discharge nozzle of the clamp type comprising, a tubular member having a clamping member at its outer end, a conduit slidably disposed in said tubular member having a discharge orifice at one end in registration with said clamping member and formed at its opposite end with an enlargement in the bore thereof, a coupler having a ball head seated upon the mouth of said bore enlargement through which lubricant may be conducted to said conduit, and a manually operable sleeve engaged with the remote side of the ball head of said coupler and by threaded engagement with said clamping member whereby rotation of said sleeve may cause relative movement between said clamping member and said conduit through said ball headed coupling member, said conduit being formed in two parts free to rotate with respect to each other on a common axis, the forward end of said parts including said discharge orifice and being coupled with said tubular member to permit relative longitudinal movement therebetween but to prevent relative rotational movement.

11. A lubricant discharge nozzle comprising, a conduit having a discharge orifice at one end, the walls of said discharge orifice providing an annular contact surface for sealing engagement with a lubricant receiving fitting and located in a plane inclined with respect to the axis of the conduit, a clamping member having a fitting engaging jaw in cooperative relation with said contact surface slidably mounted relative to said conduit, means for restraining relative rotational movement between said conduit and said clamping member whereby to maintain cooperative relation between said contact surface and said jaw, and manually operated means including a sleeve mounted for rotation relative to said conduit and said clamping member for causing relative right line movement between said conduit and said clamping member to clamp said nozzle upon said fitting at will.

12. A lubricant discharge nozzle comprising, a conduit having a discharge orifice at one end, the walls of said discharge orifice providing an annular contact surface for sealing engagement with a lubricant receiving fitting and located in a plane inclined with respect to the axis of the conduit, a clamping member having a fitting engaging jaw in cooperative relation with said contact surface and slidably mounted relative to said conduit, means for restraining relative rotational movement between said conduit and said clamping member whereby to maintain cooperative relation between said contact surface and said jaw, manually operated means including a sleeve mounted for rotation relative to said conduit and said clamping member for causing relative right line movement between said conduit and said clamping member to clamp said nozzle upon said fitting at will, and a swivel connection in said conduit rearwardly of said rotational movement restraining means.

ADIEL Y. DODGE.